United States Patent [19]

Hara et al.

[11] Patent Number: 4,901,155
[45] Date of Patent: Feb. 13, 1990

[54] SIGNAL PROCESSING SYSTEM FOR LARGE SCREEN DISPLAY APPARATUS

[75] Inventors: Zenichiro Hara; Toshiji Tanaka, both of Nagasaki, Japan

[73] Assignee: Mitsubishi Denki Kabushiki Kaisha, Tokyo, Japan

[21] Appl. No.: 204,314

[22] Filed: Jun. 9, 1988

Related U.S. Application Data

[62] Division of Ser. No. 73,661, Jul. 15, 1987, Pat. No. 4,833,542.

[30] Foreign Application Priority Data

Jul. 15, 1986 [JP] Japan .................................. 61-166151
Aug. 18, 1986 [JP] Japan .................................. 61-191720
Oct. 24, 1986 [JP] Japan .................................. 61-25338

[51] Int. Cl.$^4$ .................. H04N 5/66; H04N 5/74; H04N 9/12; H04N 9/31
[52] U.S. Cl. ..................................... 358/230; 358/56; 358/60; 358/231; 340/752; 340/815.27
[58] Field of Search ................. 358/230, 240, 241, 56, 358/59, 93, 60, 231; 340/752, 766, 783, 815.12, 815.27

[56] References Cited

U.S. PATENT DOCUMENTS 4,183,062 1/1980 Weisbrod ............................ 358/230
4,234,821 11/1980 Kako ................................... 358/241
4,523,225 6/1985 Masuda ............................... 358/230

FOREIGN PATENT DOCUMENTS 58-56877 12/1983 Japan .

Primary Examiner—Tommy P. Chin
Attorney, Agent, or Firm—Sughrue, Mion, Zinn, Macpeak & Seas

[57] ABSTRACT

A large screen display apparatus comprising a display unit composed of a plurality of modules and a housing accommodating the display unit. Each of the modules includes a plurality of units arranged in a matrix form, a power source and a control unit. Further, each of the units includes a plurality of light emitting elements arranged in a matrix form and a drive circuit for the light emitting elements. Due to this arrangement, it is possible to provide a large screen display apparatus being economical, small in weight and volume and high in usability.

4 Claims, 13 Drawing Sheets

SIGNAL PROCESSING SYSTEM FOR LARGE SCREEN DISPLAY APPARATUS

This is a division of application Ser. No. 73,661, filed July 15, 1987, now U.S. Pat. No. 4,833,542.

BACKGROUND OF THE INVENTION

1. Field of the Invention

This invention relates to a large screen display apparatus made up of a number of light emitting elements which is installed mainly at outdoor stadiums or the like.

2. Description of the Prior Art

In general, in a large screen display apparatus of this type, a display section is made up of a number of signal picture element light emitting elements which are CRTs or light bulbs. In a color display apparatus, three kinds of single picture element light emitting elements; i.e., red (R), green (G) and blue (B) single picture elements are arranged regularly, or a number or single picture element light emitting elements including three colors, red, green and blue, are arranged in matrix form. More specifically, the display apparatus comprises a number of units including a plurality of light emitting elements and an electronic circuit for driving them, and is provided with a control device for controlling the display operation and a power source.

FIG. 1 shows one example of such a conventional display apparatus. In FIG. 1, reference numeral 30 designates a screen of the display apparatus; 3, units forming the screen 30; 6, a housing which accommodates a plurality of units 3, thus forming the screen; 13, a power source; and 29, a display control section for controlling the units 3 of the screen 30.

FIG. 2 is a block diagram showing the arrangement of the display control section 29. In FIG. 2, reference numeral 26 designates an analog-to-digital converter for converting an input video signal into a digital signal (hereinafter referred to an "an A/D converter", when applicable); 15, a frame memory for storing video signals digitized; 16, an on-off decision section connected to the frame memory 15; 27, a column selecting circuit connected to the on-off decision section, for selecting a column in the screen 30; 28, a line selecting circuit for selecting a line in the screen 30; 18, an address control section for performing the address control of the line selecting circuit and the frame memory 15; 22, a timing control section for performing the timing control of the A/D converter 26; and 32, single picture element light emitting elements forming the above-described units 3.

The operation of the display apparatus thus constructed will be described. A video signal applied to the display apparatus is converted into a predetermined digital signal by the A/D converter 26, which is stored in the frame memory 15. The data stored in the frame memory 15 are read out according to addresses corresponding to the single picture element light emitting elements so as to be converted into on-off signals successively, which are supplied to the light emitting elements 32 which are specified by the column selecting circuit 27 and the line selecting circuit 28. Each single picture element light emitting element 32 has a function of storage, and the on-off signal supplied to the single picture element light emitting element 32 is held thereby until another signal is supplied thereto. With respect to the contents of the frame memory 15, the data of each field are read out a plurality of times and converted into predetermined on-off signals so as to be displayed, and the accumulation of "on" time in one field is proportional to the amplitude of a video signal to be displayed by the single picture element light emitting elements 32.

A variety of screens 30 different in size can be provided by changing the arrangement of the units 3. The control device 29 can control the variety of screens.

The conventional display apparatus is designed as described above. Therefore, the resolution cannot be increased without increasing the density in arrangement of single picture element light emitting elements which are smaller in size. Accordingly, the number of single picture element light emitting elements used is extremely large, and at the same time the numbers of drive circuits and other peripheral circuits are unavoidably large. The manufacturing cost may be reduced by miniaturizing the single picture element light emitting elements; however, the amount of reduction is considerably small. And in this case, the drive circuits and the peripheral circuits should be miniaturized. Therefore, it is considerably difficult to increase the resolution, and to decrease the manufacturing cost, the weight and the width of the display apparatus at the same time.

Conversion of digital data stored in memory into those having predetermined time widths is one of the most important signal processing operations in the display apparatus. If the signal processing sections, which are heretofore located at a position, are assigned to the modules, respectively, then the manufacturing cost of the display apparatus is increased.

SUMMARY OF THE INVENTION

In view of the foregoing, an object of this invention is to provide a large screen display apparatus which is high in resolution, low in manufacturing cost, and small both in thickness and in weight.

Another object of the invention is to provide a large screen display apparatus which is capable of displaying a half-tone image, in which the time width of a digital signal can be controlled with a simple circuit.

DESCRIPTION OF THE PREFERRED EMBODIMENTS

One embodiment of this invention will be described with reference to the accompanying drawings.

Figure 3:
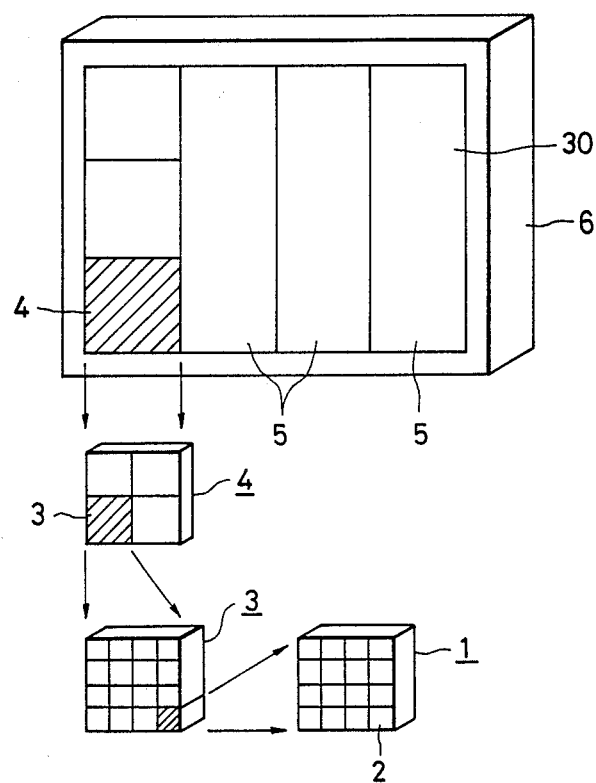
FIG. 3 is an explanatory diagram showing the entire arrangement of a display apparatus which is one embodiment of this invention.
Figure 2:
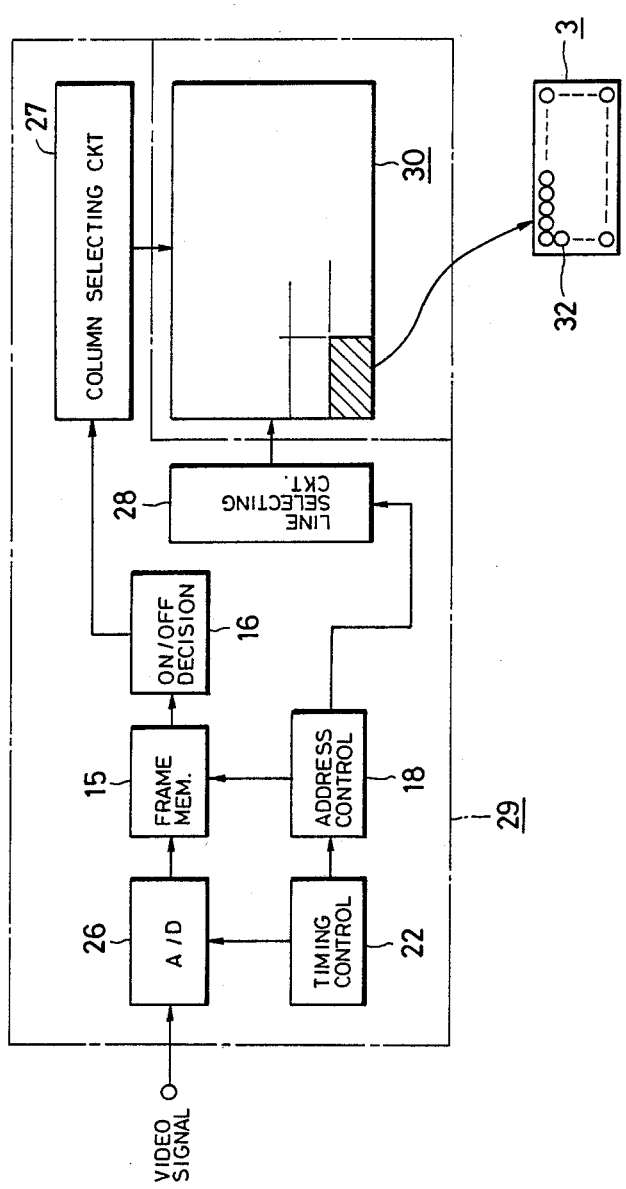
FIG. 2 is a block diagram showing the arrangement of a display control section of the conventional display apparatus.

FIG. 3 is a block diagram showing the entire arrangement of a display apparatus according to the invention. In FIG. 3, reference numeral 1 designates light emitting elements each comprising light emitting parts 2 arranged in a matrix form of k (vertically)×1 (horizontally) {k and 1 being positive integers (k=4 and 1=4 in FIG. 3)}. Further in FIG. 3, reference numeral 3 designates units each comprising the light emitting elements 1 arranged in a matrix form of m (vertically)×n (horizontally) {m and n being positive integers (m=4 and n=4 in FIG. 4)}. Reference numeral 4 designates a module comprising the units 3 arranged in a matrix form of p (vertically)×q (horizontally) p and q being positive integers (p=2 and q=2 in FIG. 3). Reference numeral 5 designates module groups each comprising the modules 4 arranged vertically; 6, a housing; and 30, a screen formed by arranging the module groups 5 horizontally in the housing 6. The light emitting elements 1 are dot matrix type display elements such as liquid crystal elements or fluorescent display tubes. The display is controlled by controlling two kinds of electrodes, namely, first and second electrodes which are crossed by one another.

Figure 4:
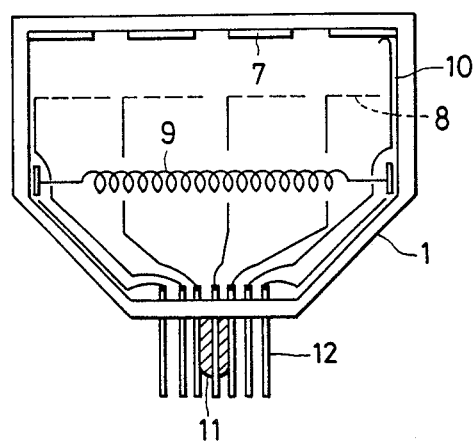
FIG. 4 is a sectional view illustrating the structure of a fluorescent display tube which is one example of a light emitting element of the display apparatus according to the present invention.

The display apparatus of the invention will be described with reference to the case where the fluorescent display tubes are employed as the light emitting elements. FIG. 4 is a sectional view illustrating the internal structure of the fluorescent display tube. In FIG. 4, reference numeral 9 designates a cathode for emitting thermions; 8, grids for accelerating the electrons; 7, anodes coated with fluorescent material; 10, conductors for applying voltage to the anodes; 11, a gas discharging outlet; and 12, connecting pins which are to be connected to external circuits. In the fluorescent display tube, the fluorescent material on the anodes 7 emits light when thermions from the cathode strike against the anodes 7. The anodes 7 are controlled by voltages applied through the conductors 10. The anode 7 correspond to the aforementioned first control electrodes, and the grids 8 to the second control electrodes.

Figure 5:
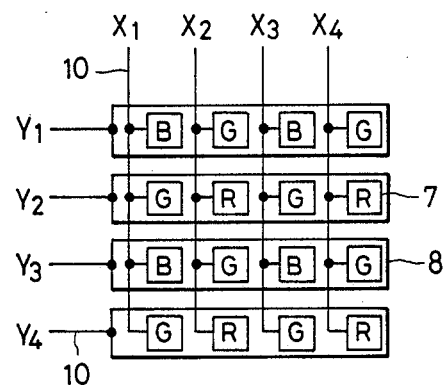
FIG. 5 is an explanatory diagram showing the arrangement of the control electrodes of the fluorescent display tube.

FIG. 5 is a diagram for a description of the arrangement of the control electrodes adapted to control a display operation. The grids 8 are connected in four lines $Y_1$ through $Y_4$, and the anodes 7 are connected in four columns $X_1$ through $X_4$; that is, the grids 8 and the anodes 7 are arranged in matrix form so that the display operations of the light emitting parts at the intersections of the first and second control electrodes are controlled. When it is required to form a full-color display apparatus, the light emitting elements should be such that three kinds of fluorescent materials, i.e. red, green and blue fluorescent materials are applied, in a regular pattern, to the anodes. If the R, G and B light emitting parts 2 are arranged in the ratio of R : G : B=1 : 2 : 1 and the arrangement of picture elements as shown in FIG. 3 is employed, then a color display apparatus high in resolution can be obtained.

Each of the units 3 is made up of the light emitting elements 1 such as fluorescent display tubes including a plurality of picture elements, and drive circuits including shift registers and latch circuits on a substrate. The control electrodes of each of the light emitting elements are arranged in matrix form, as was described above. Therefore, the number of electrodes 12 extended out of the light emitting elements 1 and the number of drive circuits can be decreased, and therefore the unit 3 can be simplified as much.

Figure 6:
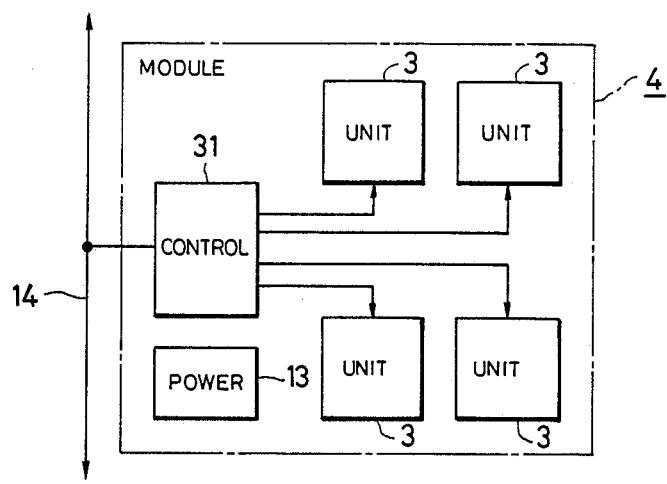
FIG. 6 is a block diagram showing the arrangement of a module in the display apparatus.

Each of the modules 4, as shown in FIG. 6, comprises: a plurality of units 3; a control circuit 31 for controlling the units 3; and a power source 13. Referring back to FIG. 1, in the conventional display apparatus, the display control section 29 and the power source 13 are provided outside of the screen 6, and are so designed as to be able to control a variety of screens different in size, and the circuitry is accordingly, intricate. On the other hand, in the display apparatus of the invention, the control circuits 31 are provided for the modules 4, respectively; that is, the control range of each control circuit 31 is limited to its own module, and therefore the control circuits 31 are simplified in circuitry as much. Especially when the number (k×1) of light emitting parts 2 in each light emitting element 1, the number (m×n) of light emitting elements in each unit 3. As the number (p×q) of units 3 in each module are so determined as to meet k=$2^r$, 1=$2^s$, m=2t, n=$2^u$, p=$2^v$, and q=$q^w$ where r and s are positive integers, and t, u, v and w are integers which are not negative); that is, these numbers are so selected as to be effective in processing digital signals, then control circuits 31 can be efficiently formed.

Figure 8:
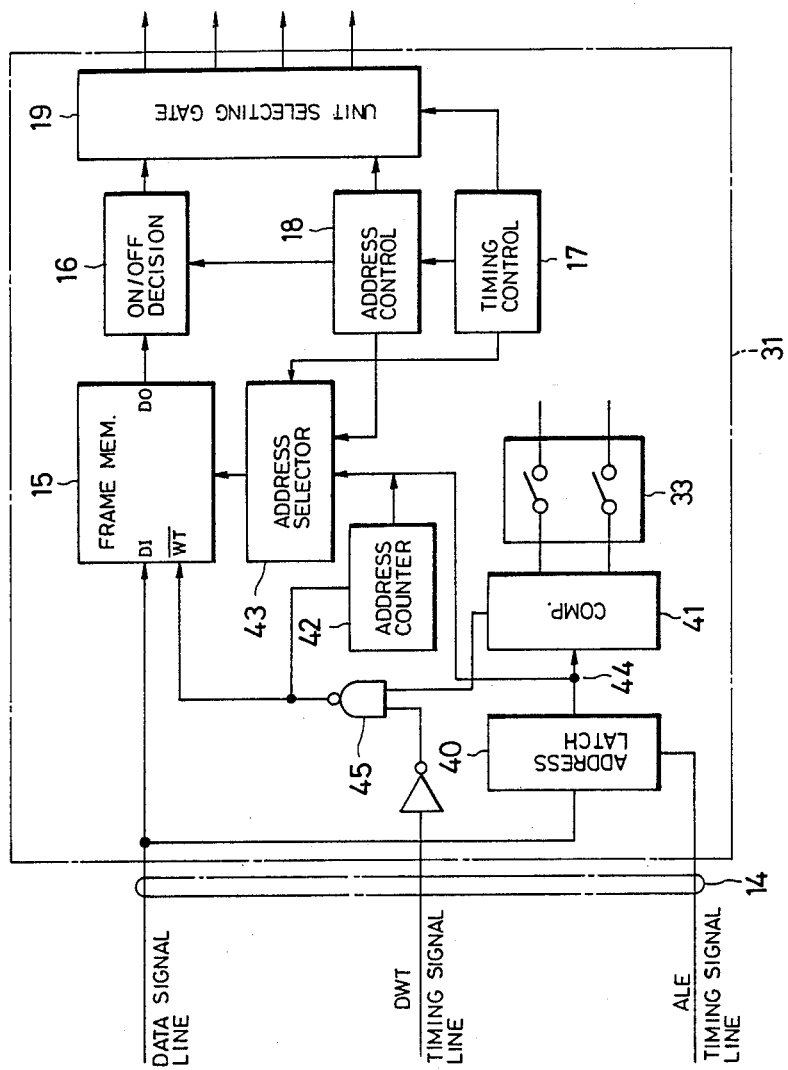
FIG. 8 is a block diagram showing a control circuit in the module.
Figure 11:
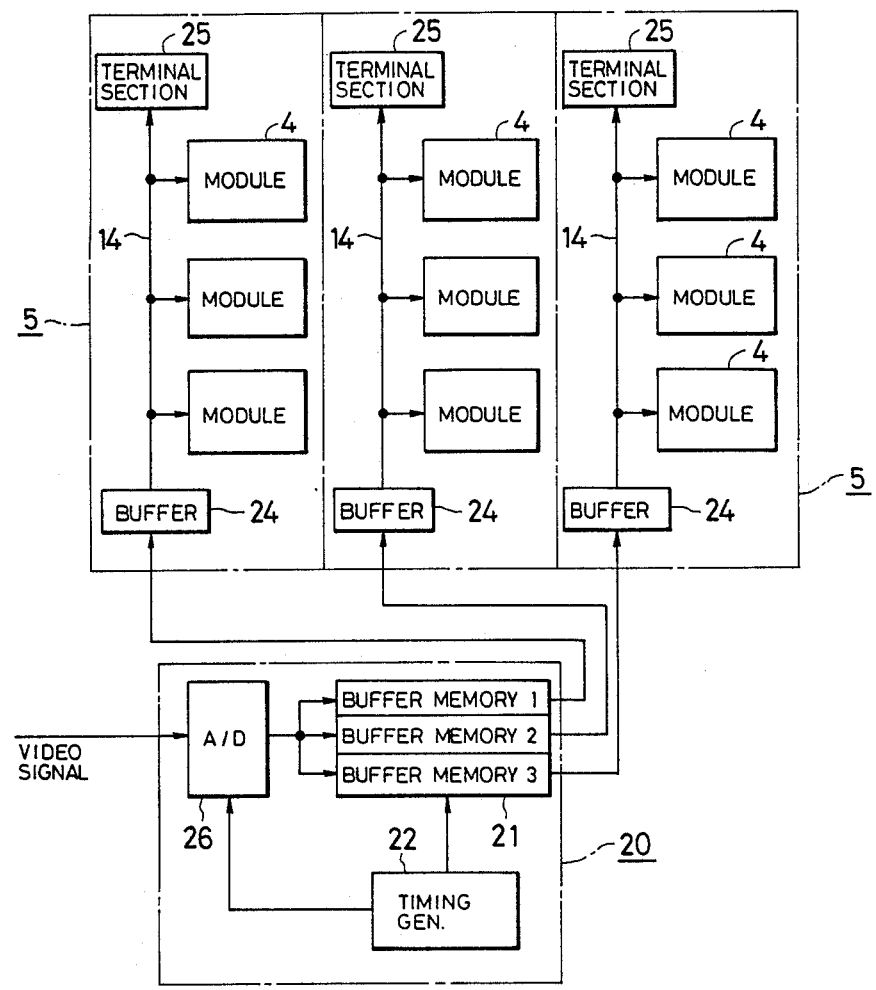
FIG. 11 is a block diagram showing the arrangement of the modules and a signal supplying means in the display apparatus.

In FIG. 11, reference numeral 24 designates buffers connected to the signal lines 14, for shaping signals; 25, terminal sections for preventing the deformation of the waveforms of signals on the signal lines 14; 26, and A/D (analog-to-digital) converter 26 for converting an input video signal into a digital signal, i.e., predetermined display data and 21, buffer memories provided respectively for the module groups 5. The buffer memories 21 operate to store the output display data of the A/D converter 26 for speed conversion, and to deliver the display data together with address data to the respective module group 5, and to form two kinds of timing signals for receiving the display data and the address data. Further in FIG. 11, reference numeral 22 designates a timing signal generating section connected to the A/D converter 26 and the buffer memories 21; and 20, signal supplying means comprising the A/D converter 26, the buffer memories 21 and the timing signal generating section 22. FIG. 8 is a block diagram showing the arrangement of the control circuit 31. In FIG. 8, reference numeral 15 designates a frame memory corresponding to the picture frame of the module 4; 43, an address selector for the frame memory 15; 16, an on-off decision section connected to the frame memory 15; 19, a unit selecting gate connected to the on-off decision section for selectively activating the units 3; and 18, an address control section connected to the address selector 43, the on-off decision section 16 and the unit selecting gate 19. Further in FIG. 8, reference numeral 17 designates a timing control section connected to the address control section 18, the unit selecting gate 19 and the address selector 43, 33, an address setting switch; 40, an address latch section; 41, a comparator for comparing the address separated by the address latch section 40 with the module address set by the address setting switch; 45, a NAND gate which is operated by the output of the comparator; and 42, and address counter. The address counter 42 is driven by the output signal of the NAND 45 which receives both the output signal of the comparator 41 and the signal obtained by inverting a timing signal provided through a timing signal line (DWT).

Figure 7:
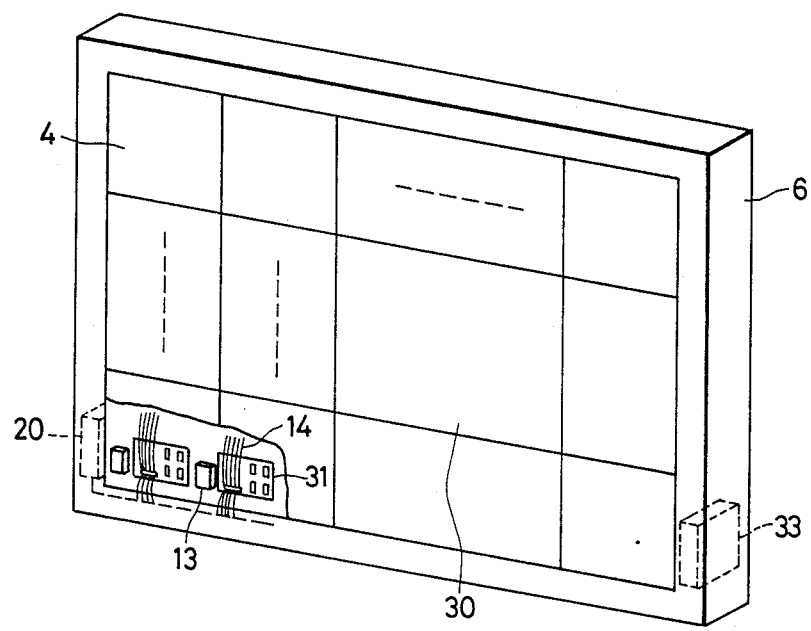
FIG. 7 is a perspective view, with parts cut away, showing the construction of the display apparatus.

As shown in FIG. 7, the control circuits 31 together with the power sources 13 are positioned behind the units forming the modules 4, and are connected vertically with the signal lines 14. The signal supplying means 20 for supplying signal to the signal lines 14, and power distributing means 33 for supplying power to the power sources 13 are accommodated in the frame 6 of the screen 30, which makes the display apparatus compact in construction.

The control circuit 31 is combined with the units 3 so that the data written in the frame memory 15 are divided into parts having predetermined time widths which are applied to the display controlling on-off decision section 16, to control the unit selecting gate 19. With respect to the contents of the frame memory 15, a data reading operation for data display and a data writing operation for display renewal are controlled in a time division manner, and writing addresses and reading address are selected by the address selector 43. The data are supplied through the common signal line 14 (including the data signal line and the timing signal lines DWT and ALE), and stored in predetermined addressed in the frame memory 15. The addresses and the data are transmitted, in multiplex form, through the common signal line 14, which reduces the number of signal lines. The address data and the display data are separated with the two kinds of timing signal lines ALE and DWT, so that the display data are written in the predetermined addresses. The reading operation should be described with reference to the arrangement of the display section.

Figure 9:
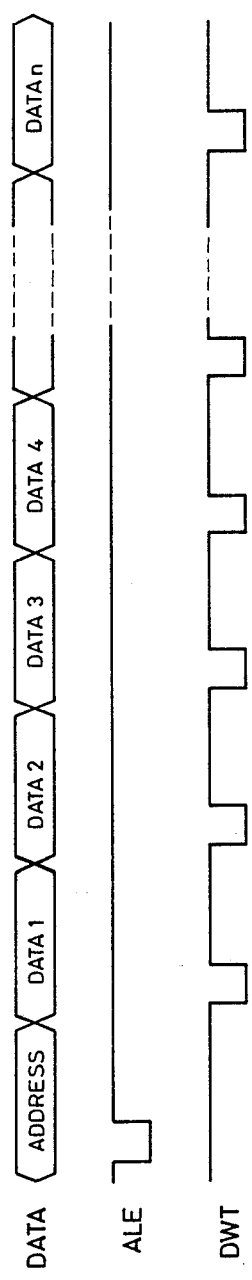
FIGS. 9 and 10 are time charts showing the timing of transmission of data with a common signal line.

Now, the operation of the display apparatus thus constructed will be described. A video signal sampled at high speed is applied to the signal supplying means 20, in which it is converted into a digital signal by the A/D converter 26, which is stored in the buffer memories 21 provided respectively for the module groups 5. The signals written in the buffer memories 21 at high speed are read out, as display data, at low speed, and are delivered to the module groups 5 together with address data for specifying the modules 4 to which the display data should be transmitted, and timing signals for determining the timing of reception of the display data and the address data. In each module group 5, the display data multiplexed with the address data in time sharing manner are received by the buffer 24 and transmitted through the signal line 14 to the modules 4. In this case, the display data received by the buffer 24 is made low in speed being subjected to speed conversion by the buffer memory 21 as was described above, and therefore a flat cable can be used as the common signal line 14. The common signal line 14 is made up of a data signal line and two kinds of timing signal lines. The upper part of FIG. 9 shows the address data and the display data which are transmitted in a time-division multiplex mode, the middle part shows a timing signal (hereinafter referred to as "an ALE signal", when applicable) for determining the timing of reception of the address data transmitted through one of the timing signal lines, and the lower part shows a timing signal (hereinafter referred to as "a DWT signal", when applicable) for determining the timing of reception of the display data transmitted through the other timing signal line.

In each of the modules 4, the data and the timing signals transmitted through the signal line 14 are received by the control circuit 31. In the control circuit 31, the address latch section 40 separates the address data according to the ALE signal, and the address data thus separated is supplied to the comparator 41. In the comparator 41, the address data is compared with the address set for the module 4 by the address setting switch 33. Only when the address data coincides with the address set by the switch 33, the gate 45 is opened. When the gate 45 is opened, the DWT signal is supplied through the gate 45 to the frame memory 15, so that a series of display data following the address data are written in the frame memory 15. In the address counter 42, the content there of is increased by the DWT signal, so that the display data writing address in the frame memory 15 is renewed and applied to the address selector 43.

The display data thus received and written in the frame memory 15 are read out a required number of times within a predetermined period of time and converted into on-off signals under the control of the address control section 18. The on-off signals thus formed are supplied through the unit selecting gate 19 to the units 3. In each unit 3, the display control is carried out in such a manner that the display data are arranged for the picture elements with the aid of the shift registers. Thus, in each light emitting element, the light emitting parts 2 emit light beams with predetermined luminances.

Figure 10:
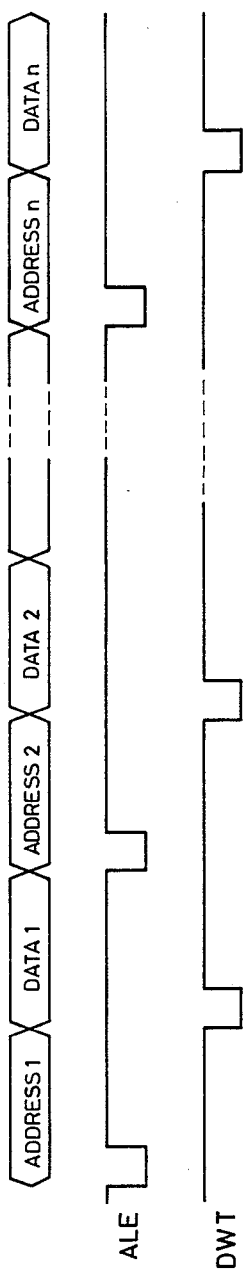

In the above-described embodiment, first address data is transmitted, then a series of display data. However, the display apparatus may be so modified that, as shown in FIG. 10, address data and display data are transmitted alternately, and they are separated with the ALE signal and the DWT signal. In this modification the address counter in the control circuit 31 of FIG. 4 can be eliminated.

Figure 12:
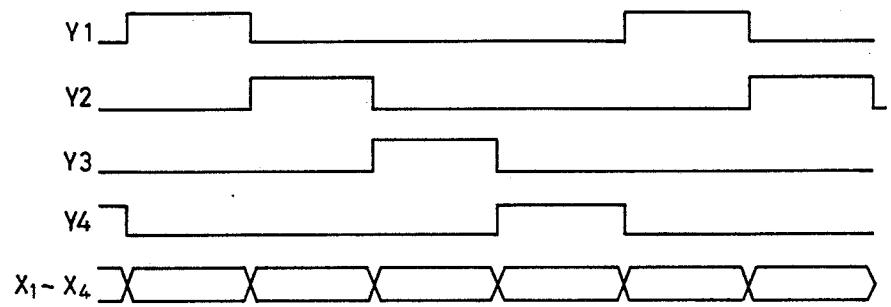
FIG. 12 is a time chart showing signals applied to the light emitting element.

FIG. 12 is a time chart showing signals applied to the light emitting element 1, which is the fluorescent display tube in this case. Scanning signals different in timing are applied to four grids 8 as indicated by $Y_1$ through $Y_4$ in FIG. 12, and predetermined video signals are applied to the anodes 7 in synchronization with the scanning signals as indicated by $X_1$ through $X_4$, so that the light emitting parts 2 at the intersections are caused to emit light. In the matrix type light emitting element 1 as described above, it is impossible to control the light emitting parts 2 separately; that is, the light emitting parts 2 are controlled in time division manner separately according to the lines, i.e., separately according to the scanning lines, and therefore the display is made continuous by increasing the scanning speed. Half-tones are displayed by a method in which signals proportional in time width to the amplitudes of the video signals are applied to the anodes 7 thereby to vary the luminances of the light emitting parts 2.

Figure 13:
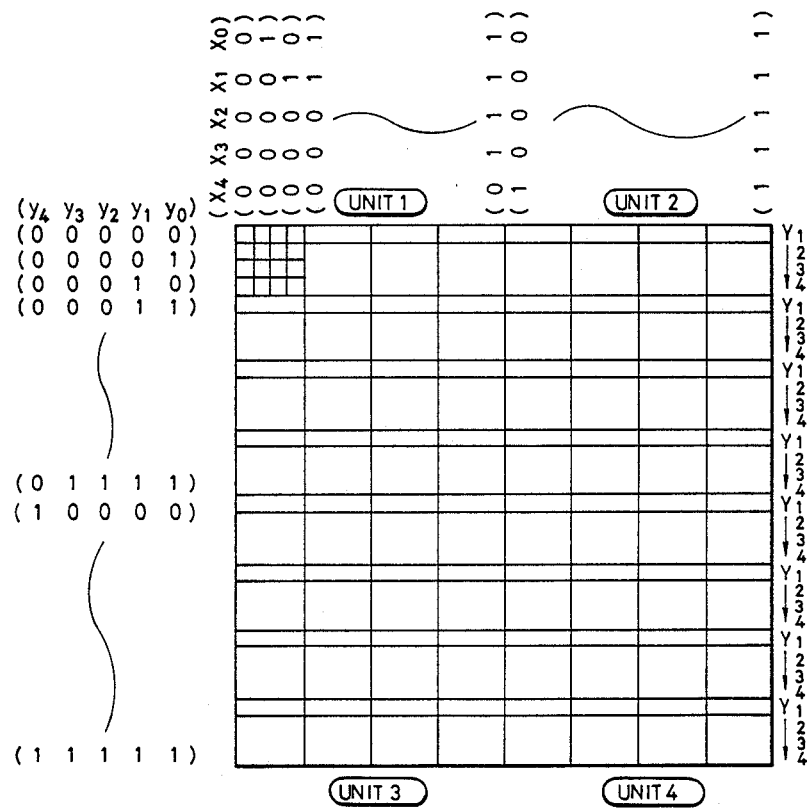
FIG. 13 is a diagram showing a display section to which the technical concept of the invention is applied.

FIG. 13 is a diagram showing the arrangement of the display section. In the display section, the picture elements are arranged in a matrix form of $2^a$ (vertically) $\times 2^b$ (horizontally).

Figure 1:
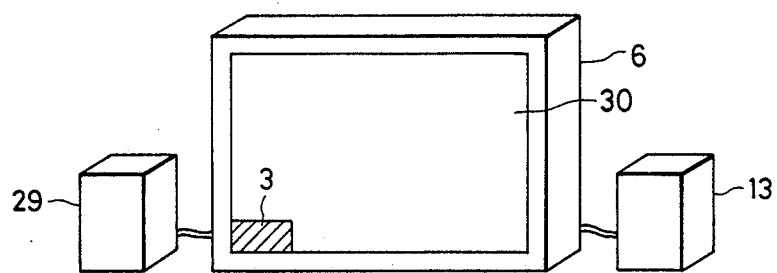
FIG. 1 is an explanatory diagram showing the entire arrangement of a conventional display apparatus.
Figure 14:
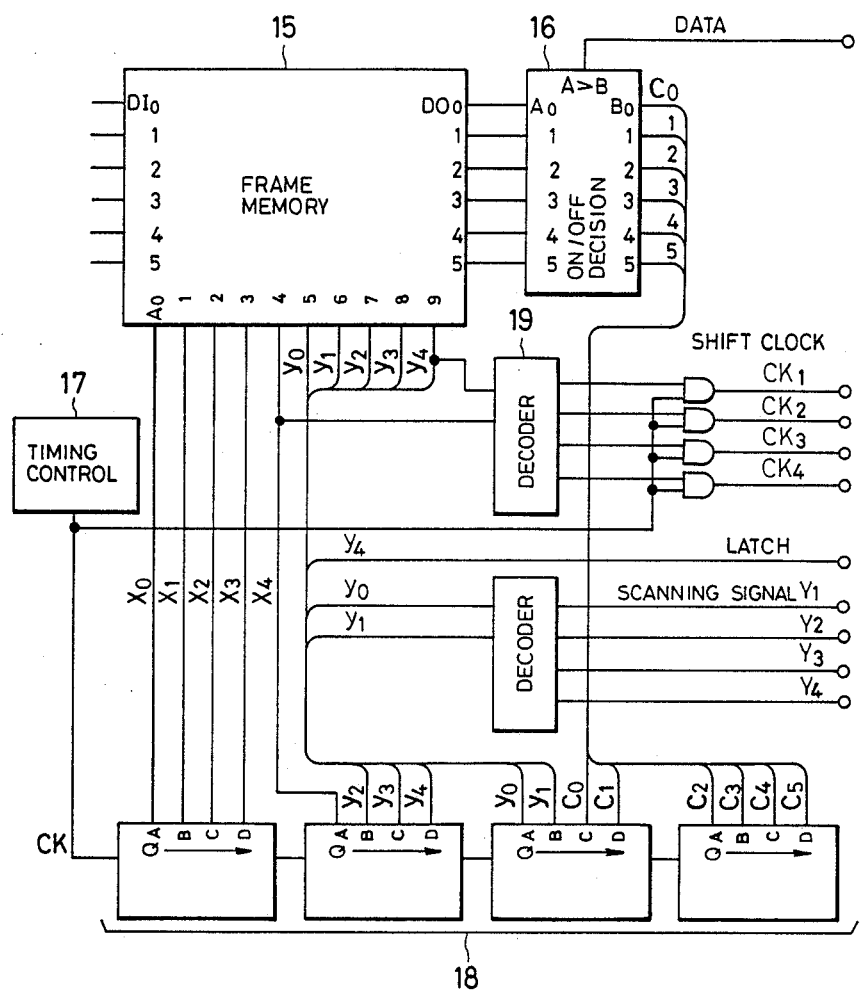
FIG. 14 is a block diagram of a display control section in FIG. 1.

FIG. 14 is a diagram showing essential circuit elements for reading data out of the frame memory 15 in FIG. 1, i.e., FIG. 14 shows components required essentially for display control. In this case, it is assumed that a reading address has been selected for the frame memory 15, and therefore the address selector 43 is not show in FIG. 14. In the frame memory 15, the addresses are specified by (a+b) signals lines arranged vertically and horizontally in correspondence to the number ($2^a \times 2$) of picture elements in the display section. In the embodiment, a=5, and b=5, and the address are specified with 10 bits; $A_0$ through $A_9$. In addition, the data are inputted with c bits, which means that a half-tone image having $2^c$ gradations can be displayed. In the embodiment, c=6 is selected. In FIG. 14, reference numeral 16 designates an on-off decision section adapted to subject 6-bit data to comparison; 17, a timing control section for controlling the generation of clock signals; and 18, an address control section made up of a series of counters for frequency-dividing a clock signal to provide an output of (a+b+c) bits corresponding to the number of picture elements $2^a \times 2^b$ and the number of display gradations $2^c$. The output bits of an address counter 42 are represented by $x_0$ through $x_4$, $y_2$ through $y_4$, $y_0$, $y_1$, and $c_0$ through $c_5$ beginning with the least significant bit. These bits $x_0$ through $x_4$, and $y_0$ through $y_4$ represent the addresses in the frame memory 15, and correspond to the arrangement of the picture elements in the display section as shown in FIG. 13. The display section, as shown in FIG. 13, is made up of four units. 3 each of which comprises sixteen (16) light emitting elements 1. In each unit 3, the light emitting elements 1 are controlled by a drive circuit provided on the same substrate.

Figure 15:
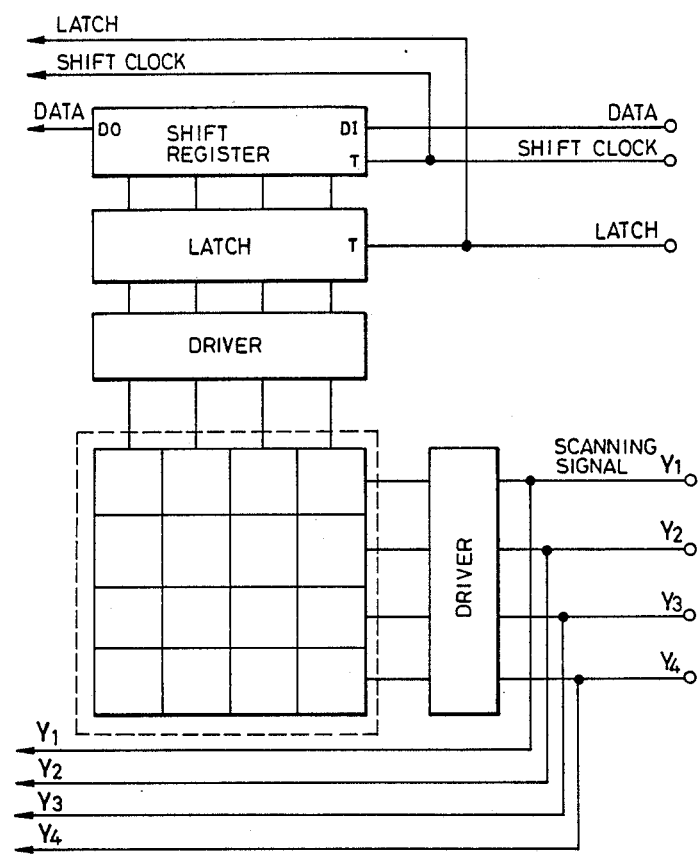
FIG. 15 is a block diagram showing a part of the control circuit for a unit.

FIG. 15 shows a part of the control circuit 31 for the units 3. The circuit shown in FIG. 15 is provide for each of the units 3. In the control circuit 31, it is necessary to send data to the units individually; however, data, a latch signal, and scanning signals are supplied to the units commonly, and clock signals $CK_1$ through $CK_4$ for arranging the data are applied to the units, respectively, so that each of the units receives the respective data with the aid of the clock signal applied thereto.

Figure 16:
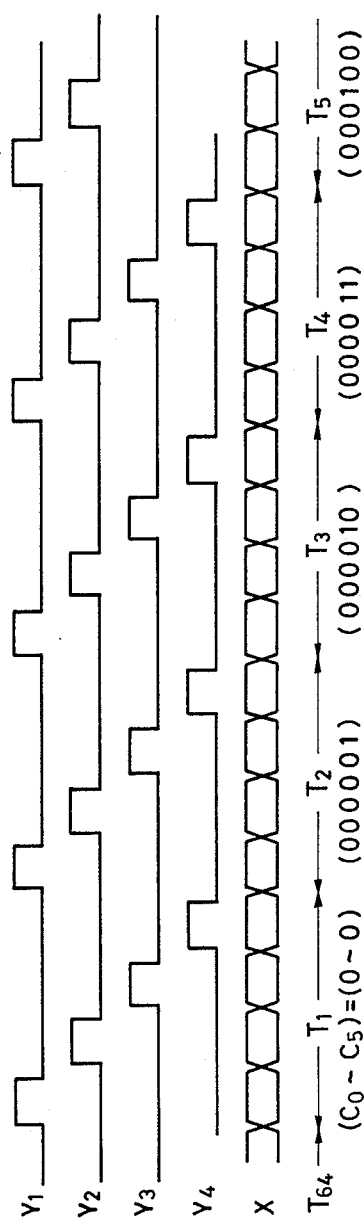
FIGS. 16, 18 and 19 are time charts for a description of the operation of the display apparatus according to the invention.

The operation of the control circuit 31 will be described in more detail. The output of the address control section 18 corresponds to an address in the frame memory 15. The data read is compared with the data ($c_0$–$c_5$) of the on-off decision section 16 which is the output of the address control section 18. As a result of the comparison, 1-bit on-off data is provided which is "1" (corresponding to the "on" state of a picture element) when the data of the frame memory 15 is larger and "0" (corresponding to the "off" state) when the data is smaller. The data thus provided is applied to the respective picture element in the respective unit with the aid of the respective clock signal described above. On the other hand, as the clock signal is counted, the address control section 18 renews the address so that data are read out of the frame memory 15 successively. This operation is carried out repeatedly. In the circuit of FIG. 14, the data of the lines Y1 are converted into on-off data, which are applied to the shift registers. The on-off data thus applied are simultaneously latched and held for a predetermined period of time thereby to drive the corresponding X electrodes (second control electrodes). At the same time, the scanning electrodes (control electrodes) Y1 are driven for light emission (the Y electrodes being hereinafter referred to as "first control electrodes", when applicable). As the clock signals are further counted, the address control section 18 carries out the same operation for the line $Y_2$, $Y_3$ and $Y_4$ repeatedly so that display of an on-off binary image forming one picture is accomplished. The timing in this operation is as shown in FIG. 12. In the case of FIG. 14, the on-off decision data, 6 bits ($c_0$–$c_5$), are allotted to six high-order bits of the output of the address control section 18. This means that, during one cyclic operation of the address control section, the binary image display is repeated sixty-four times with the output ($c_0$–$c_5$) changing form (0–0) over to (1–1) as shown in FIG. 16, a time chart. In FIG. 16, reference characters $T_1$ through $T_{64}$ designate the periods of time in which the output (($c_0$–$c_5$) of the on-off decision section 16 is (0–0), (0–1), and (1–1), respectively. More specifically, in the period of time $T_1$, the data of the frame memory 15 is compared with the comparison data (($c_0$–$c_5$)–(0–0)) of the on-off decision section 16, as a result of which on-off data are provided and displaced as a binary image. In each of the remaining periods of time $T_2$ through $T_{64}$, the comparison data is increased by one "1", and with respect to the comparison data thus increased, the content of the frame memory 15 is converted into on-off data which are displayed as a binary image similarly as in the case of the period of time $T_1$. As was described above, during one cyclical operation of the address control section 18, the data in the frame memory 15 are read sixty-four times and compared with the sixty-four different binary data ranged from (0–0) to (1–1), so that sixty-four binary images are displaced. Therefore, in the display during one cyclical operation of the address control section 18, the sum of the periods of time in which the picture elements are placed in "on" state is proportional to the contents of the memory, and half-tone images having sixty-four gradations can be displayed. On the other hand, in a television signal according to the NTSC system, one field of picture is switched every 1/60 sec. Accordingly, in displaying a television signal as an image, data corresponding to one field are rewritten in the frame memory every 1/60 sec. Therefore, selecting the clock frequency so as to allow the address control section 18 to achieve its one cyclical operation in 1/60 sec. permits the display of a television signal with sixty-four gradation. In the PAL system, one field corresponds to 1/50 sec., and therefore the clock frequency is 5/6 of that in the NTSC system.

Figure 19:
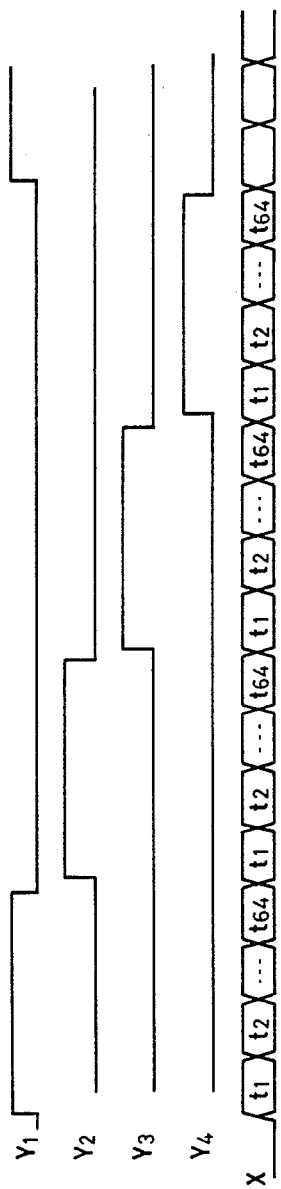
Figure 17A:
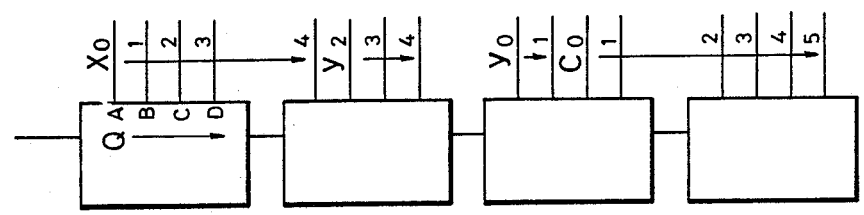
FIGS. 17(a), (b) and (c) are diagrams showing applications of the invention.
Figure 17B:
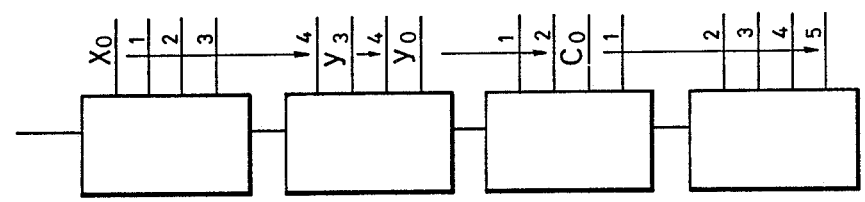
Figure 17C:
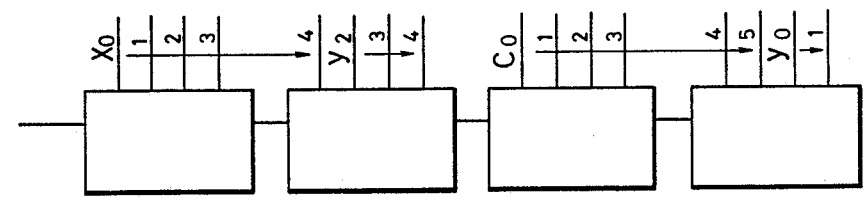
Figure 18:
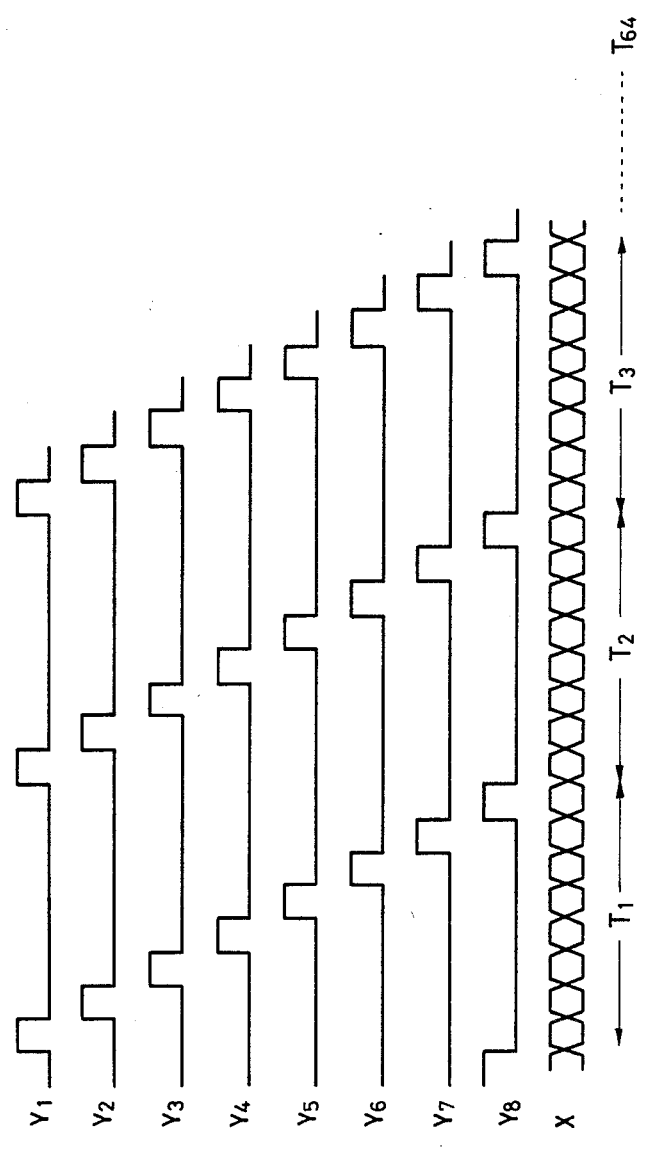

The embodiment of the invention has been described with reference to the case where the display elements are operated on ¼ duty dynamic drive for display control. However, the invention, being based on the relationships between the number of picture elements in the display section, the number of gradations of a half-tone image, and the number of outputs of the address control section 18, is effective irrespective of the display element drive system. The output of the address control section 18 may be allotted to the address or comparison data ($c_0$–$c_5$) in various methods. FIG. 17(a), (b) and (c) are examples of these methods. The part (a) of FIG. 17 is provided for FIG. 14, with the timing as indicated in FIG. 16. As the lines specified by $y_0$ and $y_1$ are scanned simultaneously, $y_0$ and $y_1$ are allotted to the high-order bits of the output of the counter. The part (b) of FIG. 17 shows the allotment in the case where the display is controlled on ⅛ duty dynamic drive. In this operation, the timing is as indicated in FIG. 18. In this case, half-tone images are obtained by overlapping sixty-four different binary images. In the case of the part (c) of FIG. 17, similarly as in the case of FIG. 14, the display is controlled on ¼ drive and $y_0$ and $y_1$ are allotted to the most significant bits. In this case, the data are read sixty-four times for every scanning-line drive period, and the time width conversion is carried out for every scanning line, so that a display having sixty-four gradations is carried out with one scanning operation with the timing as shown in FIG. 19.

As was described above, the video signal is processed for every module 4, and a complete image is displayed on the screen 30. In this operation, each of the modules 4 displays only a part of the image; that is, its display function is limited. However, each module has the control circuit 31 and the power source 13 which are essential for the display operation; that is, each module can operate as a display unit by itself. Therefore, the screen 30 which is an assembly of these modules 4 can be simplified in construction by modifying the construction of each module 4.

Further, each module 4 includes the control circuit 31 which is an essential signal processing element for a display operation, and the power source. If, under this condition, the signal supplying means 20 including the A/D converter 26 and the buffer memory 21, and the power distributing means 33 which receives electric power and distributes it to the modules are arranged inside the housing 6 of the screen 6, then all the necessary components are provided in the screen housing; that is, the resultant display apparatus is compact in construction. In the display apparatus of the invention, a plurality of light emitting elements each having a plurality of picture elements, in which a plurality of light emitting parts are arranged in matrix form are employed. The light emitting elements are arranged in a matrix form of m×n, to form a unit and a plurality of the units are arranged in a matrix form of p×q (where m, n, p and q are positive integers) to form a module. A plurality of the modules are arranged to form the screen. Therefore, the functions of the display apparatus can be distributed to the light emitting elements, units and modules effectively. Furthermore, the light emitting elements are much lower in cost than the single picture element light emitting elements, the number of which is equal to that of the light emitting parts thereof. Therefore, according to the invention, a large screen display apparatus high in resolution can be realized without increasing the manufacturing cost, the weight and the thickness thereof.

The modules with the frame memories may be two-dimensionally arranged to form the large screen. In such a display apparatus, the addresses are assigned to the modules, respectively, and the modules are connected with the common signal lines so that the display data and the address data are supplied to the modules through the common signal lines. According to the address data, the display data for the modules are selected and stored in the frame memories, and the display data thus stored are used for display control. That is, each module carries out its own display control. Thus, in the display apparatus of the invention, the display control is performed with high efficiency. Accordingly, the display apparatus of the invention can readily cope with an increase in the quantity of data which may be caused when the screen size is increased or the resolution is increased. Furthermore, in the display apparatus of the invention, the picture elements are arranged in a matrix form of $2^a$ (vertically) × $2^b$ (horizontally) (where a and b are positive integers) in the display section; i.e., the number of picture elements is so limited as to be convenient in processing digital signals. Therefore in the display apparatus, the output of the address control section comprising a series of binary counters can be used as the control signal, and the simple circuit can effectively achieve the half-tone control while the address control section performs its one cyclical operation. If the invention is practiced as module control circuit, then the module control circuit itself is simplified, and 1-bit data arrangement may be employed for the units. In addition, the units can be simplified in construction. Therefore, the large screen display apparatus can be reduced greatly in manufacturing cost and made compact in construction according to the invention.

What is claimed is:

1. A display apparatus having a plurality of picture elements (2) each capable of having any one of plural display gradations, said apparatus comprising:

a display means (4) in which picture elements (2) are arranged in a matrix form of $2^a \times 2^b$ picture elements, where a and b are integers;

a frame memory (15) for storing c-bit data representing one of $2^c$ different gradations for each said picture element where c is an integer, said frame memory responding to an address input of (a+b) bits to provide a c-bit data output corresponding to a picture element identified by said (a+b)-bit address input; and a clock signal source for providing a clock signal;

an address control section (18) for frequency-dividing said clock signal successively by factors ranging from ½ to $(\frac{1}{2})^{a+b+c}$ to obtain an output of (a+b+c) bits, wherein (a+b) of said output bits from said address control section correspond to one of said ($2^a + 2^b$) picture elements in said display means and determine said (a+b)-bit address input to said frame memory, and wherein c of said output bits from said address control section identify a reference signal level corresponding to one of said $2^c$ display gradations available for each picture element;

an on-off decision section (16) for performing a comparison of the c-bit data output from said frame memory with said reference level and for producing 1-bit data output representing "on" and "off" states of said picture elements in accordance with results of said comparison; and timing control means (FIG. 15) for applying said 1-bit data to said picture elements and holding said 1-bit data for a predetermined period of time to drive said display means;

2. A display apparatus as claimed in claim 1 wherein said display means comprises:

groups of first control electrodes comprising control electrodes for controlling said display means connected in a vertical direction;

groups of second control electrodes comprising control electrodes for controlling said display means connected in a horizontal direction; and at least one display element (3) comprising picture elements each arranged at an intersection of a pair of said first and second control electrodes.

3. A display apparatus as claimed in claim 2 wherein said address control section achieves one cyclical operation in the period of a field of a television signal.

4. A large screen display apparatus comprising a plurality of display modules cooperating to display a complete picture, wherein each of said modules is constructed as defined in claim 1.

* * * * *